United States Patent [19]

Hattop

[11] 4,248,824
[45] Feb. 3, 1981

[54] METHOD AND APPARATUS FOR STRIPING EXTRUDED POLYMER PRODUCTS

[75] Inventor: Peter H. Hattop, Williamsport, Pa.

[73] Assignee: Alcan Aluminum Corporation, Cleveland, Ohio

[21] Appl. No.: 6,303

[22] Filed: Jan. 24, 1979

[51] Int. Cl.³ .............................................. B29F 3/12
[52] U.S. Cl. .................................... 264/171; 264/174; 264/245; 425/113; 425/131.1; 425/133.1; 425/462
[58] Field of Search ............... 264/171, 245, 173, 174; 425/131.1, 133.1, 113, 462

[56] References Cited

U.S. PATENT DOCUMENTS

| | | | |
|---|---|---|---|
| 2,138,378 | 11/1938 | Johnson | 425/131 |
| 2,521,123 | 9/1950 | Lawrence | 425/113 |
| 2,674,007 | 4/1954 | Allemann et al. | 425/113 |
| 2,779,970 | 2/1957 | Stocker | 425/133.1 |
| 2,808,617 | 10/1957 | Terracini et al. | 425/462 |
| 2,945,265 | 7/1960 | Sell, Jr. et al. | 264/174 |
| 3,303,252 | 2/1967 | Rogers | 264/174 |
| 3,720,747 | 3/1973 | Anderson et al. | 264/174 |
| 3,876,743 | 4/1975 | Soderlund et al. | 264/171 |

Primary Examiner—Jeffery R. Thurlow
Attorney, Agent, or Firm—Maky, Renner, Otto & Boisselle

[57] ABSTRACT

The invention comprises a method and apparatus for producing extruded polymer products with a plurality of longitudinal stripes in the exterior surface thereof, and is particularly applicable to producing coated cable with color-coded stripes in the exterior surface thereof that are used for identification purposes. A novel dispensing ring along with spacer rings are incorporated into the head of a conventional extruder to produce the striped—extruded product.

13 Claims, 4 Drawing Figures

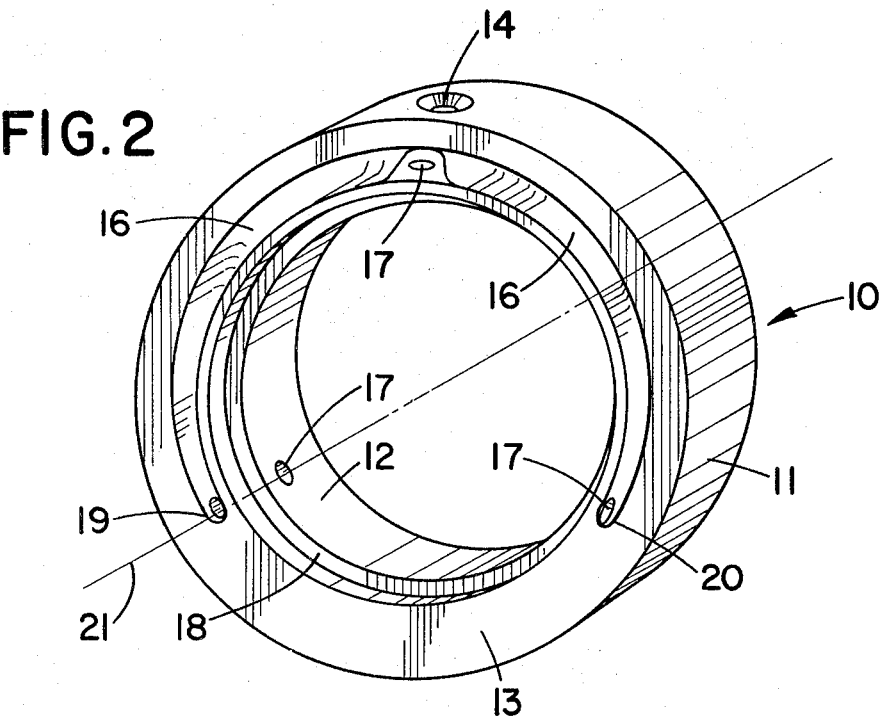
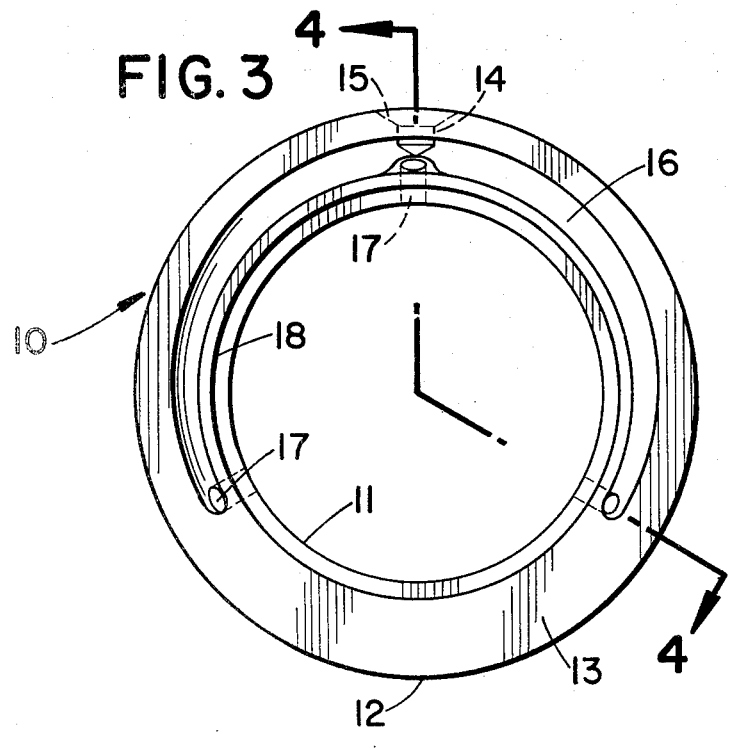 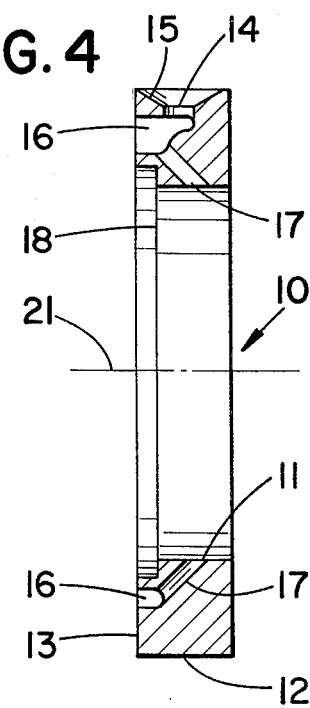

METHOD AND APPARATUS FOR STRIPING EXTRUDED POLYMER PRODUCTS

BACKGROUND OF INVENTION

1. Field of the Invention

This invention relates to methods and apparatus for producing extruded products incorporating longitudinal stripes in their sidewalls, said stripes being useful for color coding, i.e., identification, as well as for decorative purposes.

2. Description of the Prior Art

For purposes of illustration, detailed reference will be made herein to the provision of electrically insulating coatings for cable, as representing one important field of use of the type of extruded products with which the invention is concerned. The invention, however, is readily applicable to other products such as extruded pipe as well as other extruded shapes. It will be understood that the term "cable" embraces both single- and multi-strand metal electrical conductors, regardless of gauge or cross-sectional shape. It will also be understood that the term "polymer" embraces both thermoplastic and thermosetting materials including rubber and rubber-like materials.

Coloring the exterior surface of the insulating coating of cable is a common method used to identify specific cable used for specific purposes. For example, it is often a common practice to use cable with a black or gray (non-colored-coded) exterior insulating coating as a conductor and cable with a yellow (color-coded) exterior insulating coating as a ground. In most production facilities, color-coded as well as non-color coded cable are produced with the same equipment. Inherent in this set-up are lost production time and, consequently, increased costs to change over from producing one type of cable to the other due to the fact that such change over generally necessitates shutting down and cleaning out or purging the extruder. The invention disclosed herein provides an effective substitute product for the conventional color-coded cable, i.e., a multi-striped color-coded cable, while avoiding the delays and increased costs inherent in producing the conventional solid-colored, color-coded cable.

Methods and apparatus have been disclosed for producing striped cable the most pertinent of which is believed to be disclosed in the patent to Stocker, U.S. Pat. No. 2,779,970. Although this patent relates generally to the production of striped cable, it neither discloses, suggests, nor renders obvious the invention disclosed herein. Stocker disclosed apparatus for extruding strand-shaped structures of a plurality of helically arranged colors, including surrounding cable with an insulation helically subdivided into two or more colors, but did not disclose or suggest the dispensing ring or related apparatus of the present invention, nor the methods for employing the same. U.S. Pat. No. 3,720,747 to Anderson et al also discloses a method and apparatus for producing striped cable, but in no way suggests the present invention.

The patents to Myers, U.S. Pat. No. 3,860,686 and Dougherty, U.S. Pat. No. 3,903,233, disclose methods and apparatus for extruding plastic insulating materials upon continuously advancing filaments, including wire, that include techniques for balancing the flow of the insulating material to insure a uniform coating of the advancing filament. Neither of these patents, however, either separately or combined, disclose, suggest, or render obvious the dispensing ring and related apparatus and methods of the present invention.

It is well known in the art to produce various extruded shapes, particularly sheet products, with a multitude of colors. Examples of such products along with the apparatus for producing same are disclosed in prior U.S. Patents such as U.S. Pat. Nos. 2,808,617; 3,715,420; 3,914,362; 4,072,791; and 4,074,958. It is also known in the art to superimpose layers of coating on a cable and in doing so to apply coatings with different colors. Examples of apparatus or methods for doing this are disclosed in U.S. Patents such as U.S. Pat. Nos. 2,859,476; 3,024,494; 3,222,721; 3,737,490; 4,032,381, and 4,093,414. None of these patents, however, separately or combined, disclose, suggest or render obvious the present invention.

SUMMARY OF INVENTION

The invention comprises a method and apparatus for producing extruded products with longitudinal stripes incorporated in their outer surface. The invention is particularly applicable in applying insulative or protective polymeric coatings on cable with the stripes incorported for identification purposes. Cable employing such striping has been found to be identified as readily as cable that has been completely covered with a solid identifying color. In the preferred embodiment of the invention three evenly spaced stripes are incorporated on and within the surface of the cable coating but, obviously, more or less than three stripes could be employed without departing from the essence of the invention. However, the use of merely one stripe has not been found to be adequate for identification purposes. Three or more stripes are generally preferred since they can be more readily seen than merely one or two, particularly when the color-coded cable is wound or stranded with non-color-coded cable. The colored stripes are formed with a polymer material that is the same or at least compatible with the non-color coded coating used to insulate the cable.

The invention includes a novel dispensing ring that is designed for installtion in the head of any conventional extruder. The ring comprises a cylindrical shell with an exterior and an interior cylindrical surface and a bore on its exterior surface that is connected to a source of supply of fluent polymer used for striping the cable. Communicating with the bore is a tapered circumferential channel within the ring and a plurality of smaller bores that communicate with the channel and project through the cylindrical ring in an angular manner and terminate on the interior cylindrical surface of the ring. The tapered design of the channel and the angular projection of the smaller bores enhance an even flow of fluent polymer through each of the smaller bores, thus insuring an end product with uniform and evenly distributed stripes. The dispensing ring can be used with any conventional extruder die assembly by utilizing a head spacing ring and a mandrel spacing ring, each of which are machined to accommodate the specific design features of the particular die assembly with which they are to be employed. Consequently, the invention can be employed with most standard extruder head assemblies without significant redesign or retooling.

An advantage of the invention is that either striped or non-striped products can be produced by an extruder employing the invention without the necessity of cleaning out, purging or shutting down any equipment during changeover. When it is desired to produce a conventional non-color coded extruded product the extruder and related equipment are run in their normal manner without interference from the dispensing ring or any other apparatus of the invention. When it is desired to color code the extruded product, a secondary extrudate material, i.e., the fluent polymer used for striping, is forced into the dispensing ring by any conventional means, but preferably a smaller secondary extruder. Within the dispensing ring the secondary extrudate is divided into a plurality of substantially equal streams and passed through the circumferential channel to and through the smaller angular bores in the interior cylindrical surface of the ring. From these bores the secondary extrudate contacts and impregnates the primary extrudate material, i.e., the non-color coded fluent polymer, forming longitudinal colored stripes in and on the surface of the primary extrudate. The degree of impregnation into the primary extrudate material by the secondary extrudate is dependent on the flow rate of the secondary extrudate. If thicker and deeper stripes are required, the flow rate of the secondary extrudate will be increased, and, alternatively, if thinner stripes are required, the flow rate will be reduced.

A novel feature of the invention is the design and implementation of the dispensing ring and related apparatus. Objectives of the invention include a method and the design of apparatus for color-coding extruded polymer products in a manner that solves the problems that have plagued the prior art while at the same time are simple and economical in construction and utilization. Other novel features and objects will appear from the description of the preferred embodiment.

BRIEF DESCRIPTION OF THE DRAWINGS

FIG. 2 is an enlarged perspective view of a dispensing ring embodying the invention.

FIG. 3 is a frontal view of the dispensing ring of FIG. 2.

FIG. 4 is sectional view of the dispensing ring of FIGS. 2 and 3 taken along line 4-4 of FIG. 3.

DESCRIPTION OF THE PREFERRED EMBODIMENT

Figure 1:
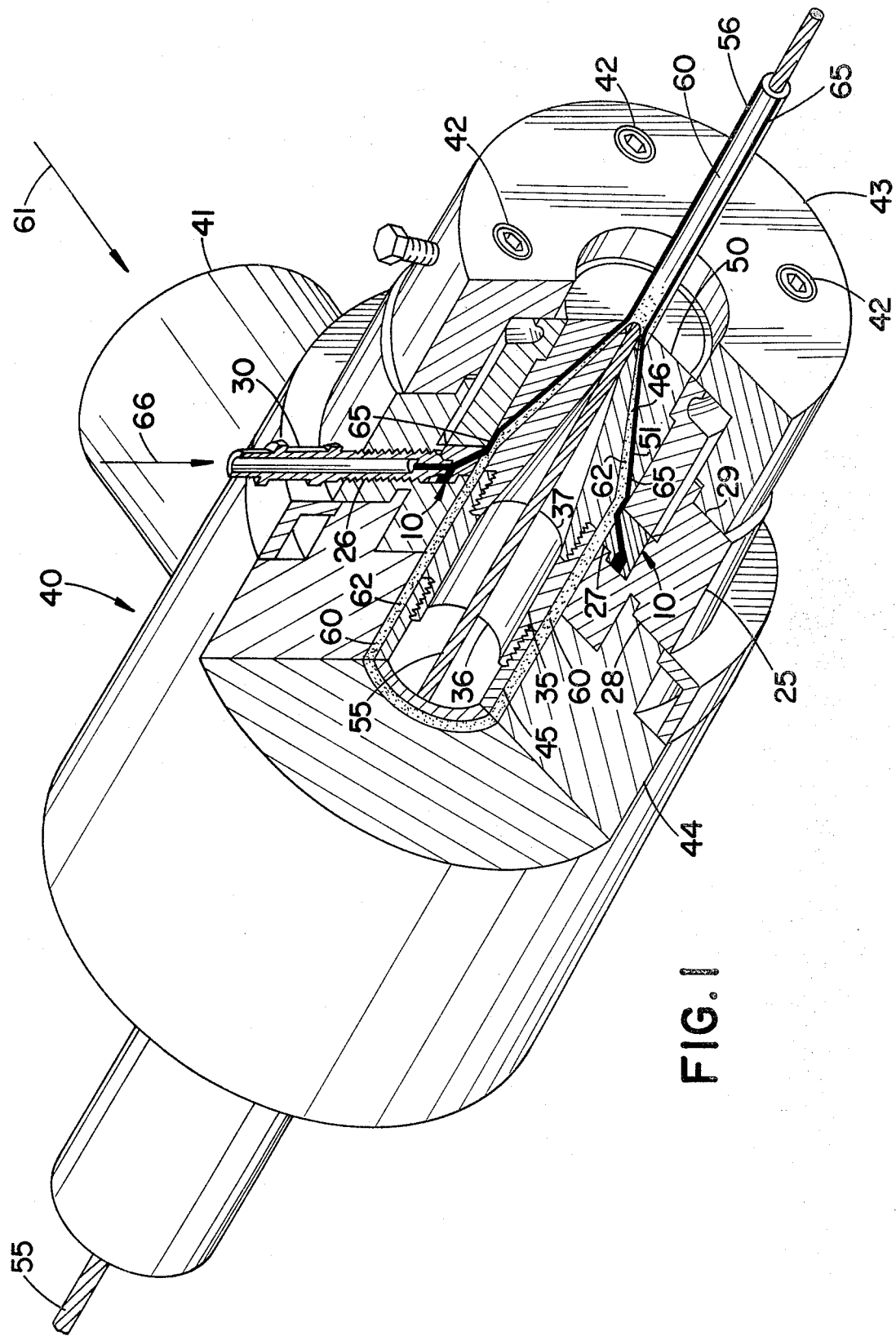
FIG. 1 is a perspective view in partial section of a cross-head extrusion die assembly utilizing the invention in a particular form.

A preferred embodiment of the invention comprises dispensing ring 10 in a cross-head extruder die assembly generally indicated at 40. The die assembly depicted in FIG. 1 is of a specific type suitable for applying a polymeric coating on a wire or cable and is attached to a primary extruder, not shown, generally located at 41. It is to be understood, however, that implementation of the invention is not limited to the specific die assembly illustrated herein. The invention is suitable for use with other types of conventional die assemblies used for producing extruded products.

Incorporated into the die assembly along with the dispensing ring 10 are head spacing ring 25 and mandrel spacing ring 35. Spacing rings 25 and 35 along with dispensing ring 10 are secured to die assembly 40 by bolts 42 which extend from die head cover 43 through the spacing rings and terminate in housing 44. Inserted through a threaded bore 26 in spacing ring 25 is feed tube 30 which communicates with dispensing ring 10 and a secondary extruder, not shown, used to supply a colored fluent polymer to dispensing ring 10 to be used to stripe the extruded product. Also secured within the die assembly 40 is mandrel 45, guider tip 46 and forming die 50 which function to direct the flow of fluent polymer onto bare cable 55 to form coated cable 56.

Dispensing ring 10, which is best shown in FIGS. 2 to 4, comprises a cylindrical shell with an exterior cylindrical surface 11, an interior cylindrical surface 12 and an end facing 13. Exterior surface 11 has a bore 14 in it that communicates with circumferential channel 16. Channel 16 comprises a groove in end facing 13 that is tapered so that its cross-sectional area is at a maximum at the inlet of said channel near bore 14 and at a minimum at the end points 19 and 20 of said channel. Communicating with channel 16 are internal bores 17 which project from the channel to and through interior surface 12 at an angle with the center axis 21 of ring 10 of preferably about 45°. Also cut into end facing 13 is groove 18 which accommodates shoulder 27 of ring 25 when installed in the die assembly. Bore 14 includes counterbore section 15 which is adapted for receiving feed tube 30.

The end facings 28 and 29, and 36 and 37 of spacing rings 25 and 35, respectively, are machined to accommodate the internal design of each of the appropriate facings of head cover 43 and housing 44, and mandrel 45 and guider tip 46, respectively, as illustrated in FIG. 1. The spacing rings are employed to permit the utilization of dispensing ring 10 with die assemblies that have already been designed or manufactured thus permitting the utilization of the invention with existing equipment and thereby avoiding the necessity of buying or designing new die assemblies. It is to be understood that the specific design of each end facing of rings 25 and 35 will be dependent on and accommodatable with the particular die assembly with which the invention is to be employed.

The details of the operation of the die assembly 40 and dispensing ring 10, are illustrated in FIG. 1. The primary extrudate material 60 contemplated to be a thermosetting, thermoplastic or rubber-like composition is prepared for extrusion in any manner that is well known and acceptable to the art. With cable or wire applications it is often pigmented so that it will be gray or black in color. The specific material selected is dependent on the properties desired for the end product, and the operating conditions of the extruder are largely dependent upon the material selected. The criteria for selecting each are well known to the art.

The extrudate material 60 enters the die assembly 40 generally at and in the direction indicated by arrow 61 in a fluent or melt condition. As the extrudate is forced into die assembly 40 it hits a vane, not shown, which changes its direction of flow 90° and passes it into passage 62 which is defined by the outer walls of mandrel 45, mandrel spacing ring 35 and guider tip 46, and the inner walls of housing 44, head spacing ring 25 and the inner wall 51 of forming die 50. As the extrudate emerges from die 50, it coats cable 55 in a uniform manner resulting in and extruded product comprising a cable or wire with a protective or insulative coating around it. The assembly illustrated in FIG. 1 can be used to produce a non-color coded cable as just described or a color-coded, i.e., striped, cable. When non-colored coded cable is being produced, back-flow into the bores 17 of ring 10 by the primary extrudate 60 is prevented by the design of the projecting angle of bores 17 away from the momentum of flow of the primary extrudate and by maintaining pressure in the bores 17 about equivalent to that being exerted by the primary extrudate stream. The easiest way of doing the latter is to maintain dispensing ring 10 with extrudate material in it during the production of non-color coded cable.

When it is desired to produce cable with identifying stripes the procedure discussed above is followed with the addition that a secondary extrudate material 65 is forced into feed tube 30 in the direction indicated by arrow 66 by a second, generally smaller, extruder, not shown, and passed into dispensing ring 10. The secondary extrudate material 65 will generally be either the same as the primary extrudate material with the exception that it will be pigmented differently so that it will exhibit a different color, or it will be selected from materials that are at least compatible with the primary extrudate. It is important, particularly with cable applications, that there be sufficient reaction, e.g., crosslinking, between the primary and secondary extrudate materials such that a final integrated product will be attained that is impervious or sufficiently resistent to moisture and other environmental influences as well as being resistent to cracking or separating, particularly at the interfaces of the two materials. In the production of cable it has been found to be advantageous to employ a yellow polymer as the secondary extrudate material 65 while using a black or gray polymer as the primary extrudate material 60. Obviously, different colors and different combinations of colors could be employed without departing from the essence of the invention.

The secondary extrudate material 65 enters the dispensing ring 10 through the bore 14 and passes into circumferential channel 16 wherein it divides into three substantially equal streams and flows to and through bores 17 at substantially equal rates. As the extrudate 65 passes through bores 17 it contacts and penetrates the stream of the primary extrudate 60 in passage 62 slightly upstream of the entrance to die 50 resulting in the formation of three substantially equally spaced longitudinal stripes of secondary extrudate on and within the exterior surface of the primary extrudate. As the mixture of the two extrudates along with cable 45 pass through die 50 an end product 56 is formed comprising a cable with an insulative or protective polymeric coating which includes three substantially equally spaced longitudinal identifying stripes in its outer surface. The width and depth of the stripes is directly dependent on the flow rate of the secondary extrudate as it emerges from the bores 17 of dispensing ring 10. The flow rate of the secondary extrudate is directly dependent on the rate of flow from the secondary extruder and is also affected by the rate of flow of the primary extrudate.

The 45° angle of each of the bores 17 with axis 21 of ring 10 provides several advantages. Along with the advantages discussed, above, it enhances the control of the penetration of the secondary extrudate into the stream of the primary extrudate material. With a larger angle, e.g., 90° wherein the entry would be at a perpendicular, the penetrating force of the secondary extrudate material would from time to time tend to be too great and thereby increase the likelihood of build-ups and surges resulting in uneven sections of striping. An angle substantially less than 45° would have the opposite effect, i.e., the penetrating force would tend to be not sufficient and again uneven sections of striping would result thus detracting from the appearance and desirability of the end product. For these reasons, an angle of approximately 45° has been found to be optimum for controlling the penetration of the secondary extrudate into the stream of the primary extrudate material.

Also, the 45° angle optimizes the pulling force exerted on the secondary extrudate stream by the flow of the primary extrudate stream as the secondary stream passes through bores 17 and merges with the primary stream. The pulling force so exerted is due to a pressure differential caused by the momentum of the flow of the primary extrudate stream. This force reduces the power requirements of the secondary extruder and facilitates the penetrating action of the secondary stream into the primary. An angle substantially greater than 45° would reduce the effect of the pulling force on the secondary stream. An angle substantially less than 45° would reduce the ability of the secondary stream to penetrate the primary.

The taper in the design of circumferential channel 16 of dispensing ring 10 is an important feature in the design of the ring. Without the taper it would not be possible to provide a substantially equal flow rate of the secondary extrudate through all three of the bores 17 and, were not uniform in appearance thus detracting from the desirability of the end product. The taper compensates for the loss of momentum due to friction experienced by the portions of the secondary extrudate stream that are required to pass through channel 16 all the way to end points 19 and 20. The same loss of momentum is not experienced by the stream passing through the bore 17 that is disposed directly opposite bore 14. Without the taper the flow rate through the bore 17 directly opposite bore 14 would be greater, and, consequently, the resulting stripe would be larger, than the flow rate through the bores 17 at end points 19 and 20.

While a preferred form and embodiment of the invention has been illustrated and disclosed, other forms, as well as changes and improvements therein and thereon will occur to those skilled in the art who come to know and understand this invention, all without departing from the essence and substance thereof. Therefore, this patent is not to be restricted to only that which is specifically disclosed herein, or in any manner inconsistent with the progress by which this invention has promoted the progress of the art.

I claim:

1. A method for extruding a polymer product with more than two longitudinal stripes incorporated on the surface of said product, said method comprising the steps of forcing a primary fluent polymer into a first confined passageway, forcing a secondary fluent polymer into a second confined passageway, dividing the flow of the secondary fluent polymer into more than two substantially equal streams, forcing at least two of said streams of secondary polymer through confined tapered passageways, combining the secondary fluent polymer with the primary fluent polymer by forcing the streams of the secondary polymer into a penetrating relationship with the stream of the primary polymer, said streams of secondary polymer contacting said stream of primary polymer from a projecting angle of about 45°, and passing the combined fluent polymers through a restricted opening.

2. The method of claim 1 wherein the product comprises a cable with a polymer coating around it, said coating including a plurality of longitudinal stripes incorporated into the exterior surface thereof.

3. The method of claims 1 or 2 wherein three longitudinal stripes are incorporated into the exterior surface of said product.

4. The method of claims 1 or 2 wherein the primary polymer is pigmented so that it is either gray or black in color and the secondary polymer is pigmented so that it is yellow in color.

5. The method of claims 1 or 2 wherein the secondary polymer consists of a material that is the same as the primary polymer with the exception that it is pigmented differently so that it will exhibit a different color or is compatible with the primary polymer such that the product will be resistant to environmental influences and separation at the interface of the two polymers.

6. In an apparatus for extruding polymer products such as insulated cable, pipe and the like including:
an extruder head assembly with a housing, a mandrel mounted in said housing, die and guider tip means mounted in said housing down stream from said mandrel, and a head cover monuted on said housing, said head cover partially enclosing said die and guider tip means, the improvement which comprises:
a dispensing ring mountable in said head assembly upstream from the converging sections of said die and guider tip means, said dispensing ring comprising a cylindrical shell with exterior and interior cylindrical surfaces and an end facing, an inlet bore in said exterior surface, more than two outlet bores in said interior surface, said outlet bores projecting downstream at an angle of about 45° with the center axis of said dispensing ring, and channel means in said end facing for dividing the flow of a fluent polymer from said inlet bore into more than two substantially equal streams and passing said fluent polymer to said outlet bores, said channel means including a tapered passageway for passing the flow of said fluent polymer to at least two of said outlet bores;
a mandrel spacing ring mountable in said head assembly on an end of said mandrel adjacent to said guider tip means; and
a head spacing ring mountable in said head assembly between said housing and said head cover, the end facings of said head spacing ring accommodating corresponding end facings of said housing and said head cover, said head spacing ring being mountable in contacting relation with said dispensing ring.

7. The apparatus of claim 6 wherein said channel means comprises a groove in said end facing of said dispensing ring, said groove communicating with said inlet bore and said outlet bores, the cross-sectional area of said groove tapering from a maximum at the point of communication with said inlet bore to a minimum at its end points.

8. The apparatus of claims 6 or 7 with three outlet bores, said outlet bores being substantially equally spaced from each other.

9. The apparatus of claims 6 or 7 with means for supplying a fluent polymer to said dispensing ring.

10. The apparatus of claim 9 wherein said means includes a feed tube communicating with the bore on the exterior surface of said dispensing ring.

11. The apparatus of claims 6 or 7 including a primary extruder for supplying a primary extrudate material to the head assembly and a secondary extruder for supplying a secondary extrudate material to the dispensing ring.

12. A dispensing ring for use in the head of a conventional extruder for imparting more than two longitudinal parallel stripes to extruded polymer products comprising:
a cylindrical shell, said shell having an exterior and an interior cylindrical surface and an end facing;
an inlet bore in said exterior cylindrical surface;
a plurality of outlet bores in said interior cylindrical surface;
a channel in said end facing, said channel communicating with said inlet bore and said outlet bores,
said outlet bores projecting from said channel through said interior cylindrical surface at an angle of about 45° with the center axis of said cylindrical shell,
the cross sectional area of said channel tapering from a maximum at the point of communication with said inlet bore to a minimum at its end points.

13. The apparatus of claim 12 with three outlet bores, said outlet bores being substantially equal in size and substantially equally spaced from each other.

* * * * *